(12) United States Patent
Bray et al.

(10) Patent No.: US 6,483,849 B1
(45) Date of Patent: Nov. 19, 2002

(54) NETWORK TRANSCEIVER HAVING A LED INTERFACE OPERABLE IN PARALLEL AND SERIAL MODES

(75) Inventors: Michael Richard Bray, San Jose, CA (US); Geetha Rangan, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/291,000

(22) Filed: Apr. 14, 1999

Related U.S. Application Data
(60) Provisional application No. 60/082,183, filed on Apr. 17, 1998.

(51) Int. Cl.[7] .................................................. H04J 3/26
(52) U.S. Cl. ........................ 370/465; 370/438; 370/501
(58) Field of Search ............................ 370/465, 501, 370/438; 710/18, 19, 316; 345/30, 111; 340/815.4–815.92

(56) References Cited

U.S. PATENT DOCUMENTS

| | | | |
|---|---|---|---|
| 5,430,726 A | * | 7/1995 | Moorwood et al. .......... 370/438 |
| 5,598,418 A | * | 1/1997 | Lo et al. ..................... 370/501 |

OTHER PUBLICATIONS

Advanced Communication Devices "Data Sheet: ACD82124; 24 Ports 10/100 Fast Ethernet Switch Controller", Last Update Nov. 5, 1998.*
Intel Application Note AP–733: "Switched Ethernet Reference Design Description", Jul. 23, 1996.*
Internet URL http://www.amd.com/us–en/Corporate/VirtualPressRoom/0,,51_104_543_555~985,00.html, "AMD Continues the Cost–Reduction Path for 100Mbps Ethernet", reprint of article dated Apr. 28, 1997.*

* cited by examiner

Primary Examiner—Salvatore Cangialosi

(57) ABSTRACT

A novel multi-port network transceiver having an LED interface supporting parallel and serial LED modes. The LED interface has a pair of LED pins for each port. In the parallel LED mode, one pin of this pair represents status of a 10 Mb/s communication, whereas another pin represents status of a 100 Mb/s communication. In the serial LED mode, status information for all ports is transferred using 3 pins supplying a serial data stream, a frame signal and a clock signal. The serial data stream is composed of frames, each of which represents various events for the multiple ports. The frame signal is used to identify the boundary between the frames. The transfer of the serial data stream is synchronous to the clock signal.

9 Claims, 4 Drawing Sheets

US 6,483,849 B1

NETWORK TRANSCEIVER HAVING A LED INTERFACE OPERABLE IN PARALLEL AND SERIAL MODES

This application claims priority from provisional patent application serial No. 60/082,183 filed on Apr. 17, 1998, and entitled "Quad Fast Ethernet Transceiver for 10 BASE-T/ 100 BASE-X (QFEX 10/100)," the entire disclosure of which is incorporated by reference herein.

TECHNICAL FIELD

The present invention relates to network interfacing, and more particularly to a novel network transceiver having a Light Emitting Diode (LED) interface operable in parallel and serial modes in accordance with user requirements.

BACKGROUND ART

A Local Area Network (LAN) is a communication system that provides a connection among a number of independent computing stations within a small area, such as a single building or group of adjacent buildings. One type of network structure uses one or more repeaters in a star topology, with each repeater having several ports. A data packet received at one port is retransmitted to all other ports of the repeater. Each repeater in turn restores timing and amplitude degradation of data packets received at one port and retransmits the packets to all other ports.

Traditional Ethernet networks (10 BASE-T) operate at 10 Mb/s Ethernet protocol, as described by IEEE Standard 802.3, the majority of Ethernet interfaces currently operate at this data rate. However, a newer Ethernet standard, under IEEE standard 802.3 u, accomplishes the faster operation of 100 BASE-T systems, at a 100 Mb/s data rate (i.e., a 125 Mb/s encoded bit rate) using unshielded twisted pair (UTP) physical media. The 100 BASE-T standard defines operation over two pairs of category 5 UTP (100 BASE-TX) or category 3 UTP. The 100 BASE-FX network medium, covered by the 100 BASE-T standard, allows operation over dual fiber optic cabling.

Ethernet protocol provides for a Media Access Control (MAC), enabling network interface devices at each network node to share accesses to the network medium. One type of connection, termed a Media Independent Interface, or MII, connects the MAC to a physical layer (PHY) transceiver configured for a particular network medium, e.g., 10 BASE-T, 100 BASE-FX, or 100 BASE-TX. The physical layer transceiver is configured for converting the MII protocol signals output by the MAC into analog network signals, such as Multiple Layer Transition-3 (MLT-3) signals for 100 Mb/s Ethernet networks, or Manchester-encoded signals for 10 Mb/s Ethernet networks.

The transceiver may be provided with a Light Emitting Diode (LED) interface for connecting to LEDs that indicate network status and events, such as link status, collision status, receive and transmit activity, etc. However, for some transceiver applications, users need to continuously monitor LED information on multiple aspects of network activities, whereas other transceiver applications require only basic status information.

Therefore, it would be desirable to provide the transceiver with ability to configure the LED interface so as to support various LED modes depending on user requirements.

DISCLOSURE OF THE INVENTION

The invention provides a novel network transceiver having multiple ports for supporting data communications with multiple data communication devices in a local area network, such as one conforming to Ethernet protocol. The transceiver comprises an indication interface having at least a pin per port for providing connection to indication devices, such as LEDs. An indication interface configuration circuit configures the indication interface to operate in a parallel indication mode to provide parallel output of status data for the multiple physical ports, or in a serial indication mode, in which status data for the multiple physical ports is being outputted sequentially in a serial data stream.

In accordance with one aspect of the invention, the physical ports support data communication at first and second data rates. In the parallel indication mode, the indication interface comprises a first pin for each port to indicate status of data communication at the first data rate, and a second pin for each port to indicate status of data communication at the second data rate.

In the serial indication mode, the indication interface may be configured to have a data pin, a frame pin and a clock pin. The data pin is provided for shifting out a serial status data stream composed of status bits representing statuses of data communication via the multiple physical ports. The serial status data stream comprises multiple frames, each of which indicates a plurality of events representing the multiple physical ports at a given time period. The frame pin is used for transferring a frame signal that indicates the boundary between the frames. The clock pin transfers a clock signal that synchronizes the transfer of the serial status data stream.

Preferably, the indication interface configuration circuit is programmable to configure the indication interface in the parallel mode in response to a first control signal, and to configure the indication interface in the serial mode in response to a second control signal.

In accordance with another aspect of the invention, in the parallel indication mode, the indication interface presents a single event at a time for each port; and in the serial mode, the indication interface presents a plurality of various events for each port sequentially in a serial data stream.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
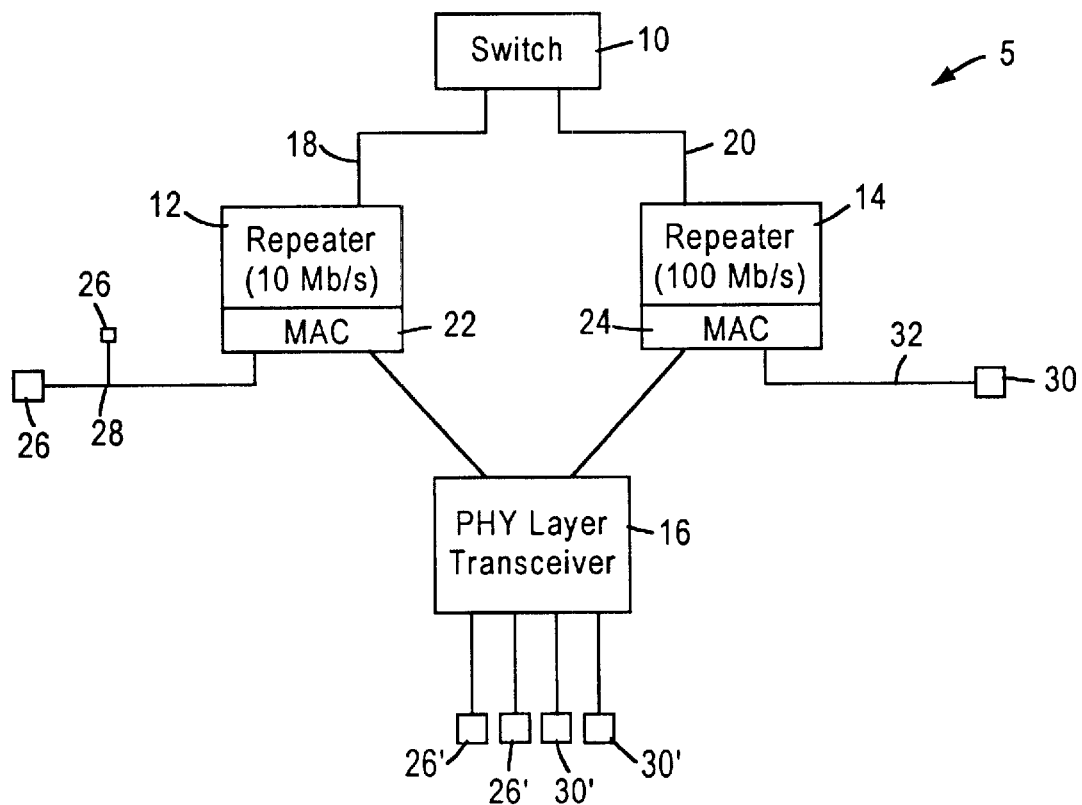
FIG. 1 is a diagram of a local area network, in which the present invention may be implemented.

FIG. 1 is a block diagram of an exemplary local area network architecture in which the present invention may be implemented. As shown in FIG. 1, the network 5 includes a network switch 10, a repeater 12 operating at a first data rate such as 10 Mb/s, a second repeater 14 operating at a second data rate such as 100 Mb/s, and a multiple port physical layer (PHY) transceiver 16. The switch 10 and the repeater 12 transfer network data via a data link 18 operating at the first data rate of 10 Mb/s. The switch 10 and the repeater 14 transfer data via a different data link 20 operating at the second data rate of 100 Mb/s. The repeaters 12 and 14 may communicate with the PHY transceiver 16 via Media Access Control (MAC) interfaces 22 and 24, respectively. As recognized in the art, the repeater 12 may also transfer network data to individual network workstations 26 operating at 10 Mb/s via a shared medium 28, and the repeater 14 may transfer data to network workstations 30 operating at 100 Mb/s via a network medium 32.

The multiple port physical layer transceiver 16 enables multiple workstations 26', 30' having different data rates of 10 Mb/s and 100 Mb/s, respectively, to communicate with the repeater interfaces 22 and 24. Moreover, the physical layer transceiver 16 enables the network data from different workstations 26' and 30' to be automatically supplied (i.e., steered) to the appropriate data rate domain, enabling more flexible implementation of multiple-rate networks.

Figure 2:
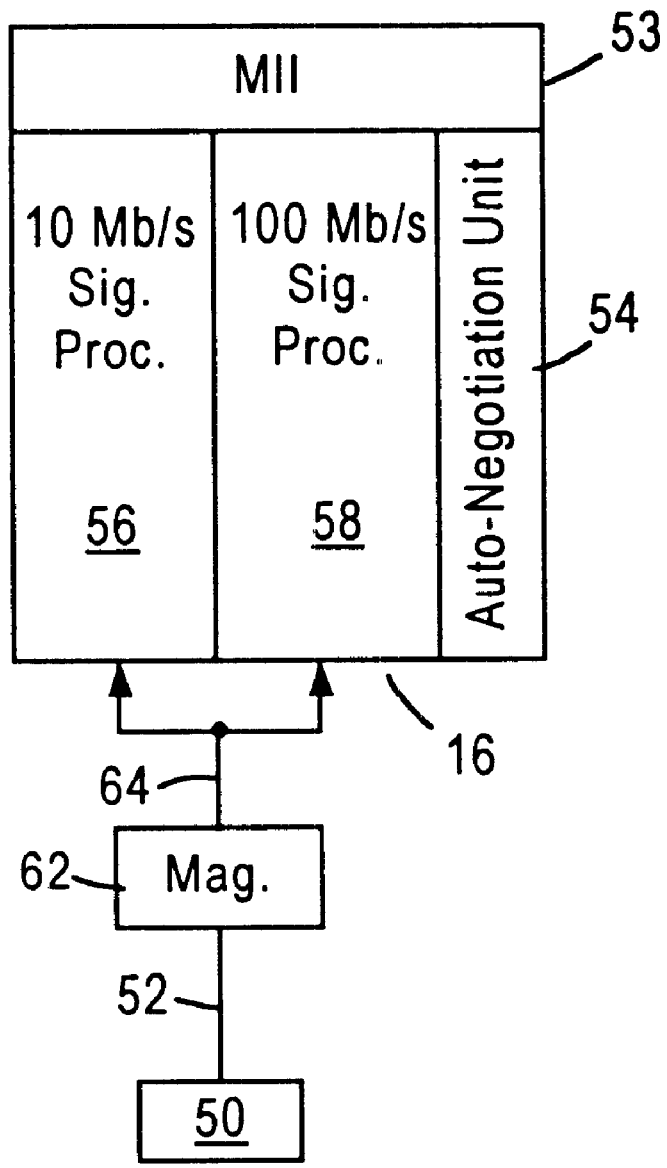
FIG. 2 is a simplified diagram of a single-port network transceiver of the present invention.

FIG. 2 shows a PHY transceiver 16 for establishing a communication path between a link partner 50 on a network medium 52 and one repeater interface from among a plurality of repeater interfaces that is data rate compatible with the operating speed (i.e., link speed) of the link partner 50. The transceiver 16 has a Media Independent Interface (MII) 53 operating at 10 Mb/s or 100 Mb/s for connecting the transceiver to the MAC engine of the corresponding repeater. An auto-negotiation unit 54 determines the speed of operation of link partner 50 on the network medium 52 using the auto-negotiation technique defined in the IEEE 802.3u standard.

The transceiver 16 includes a first data rate path 56 for converting network data between MII format and 10 Mb/s Manchester-encoded signals for transmission and reception at 10 Mb/s, and a second data rate path 58 for supporting communication at 100 Mb/s. The second data rate path 58 converts network data between MII format and a selected 100 Mb/s signal format, such as MLT-3 encoded signals.

The output of the data paths 56 or 58 is routed to the media independent interface 53, based on the data rate selected for communications between the link partner 50 and the repeater. Hence, network data from the link partner 50 is transmitted via the medium 52 to a physical interface 64 of the PHY transceiver 16 via a magnetic coupler 62. As known in the art, the magnetic coupler 62, coupled to the unshielded twisted pair (UTP) medium 52, provides AC coupling between the PHY interface 64 and the medium 52, plus electrical isolation. Depending on the determined data rate, the received analog network signals are supplied to the appropriate data path 56 or 58 to recover the network data in digital format from the received analog signals. The network data, recovered from the analog network signals, is then supplied by the appropriate data path 56 or 58 to the MII 53.

Figure 3:
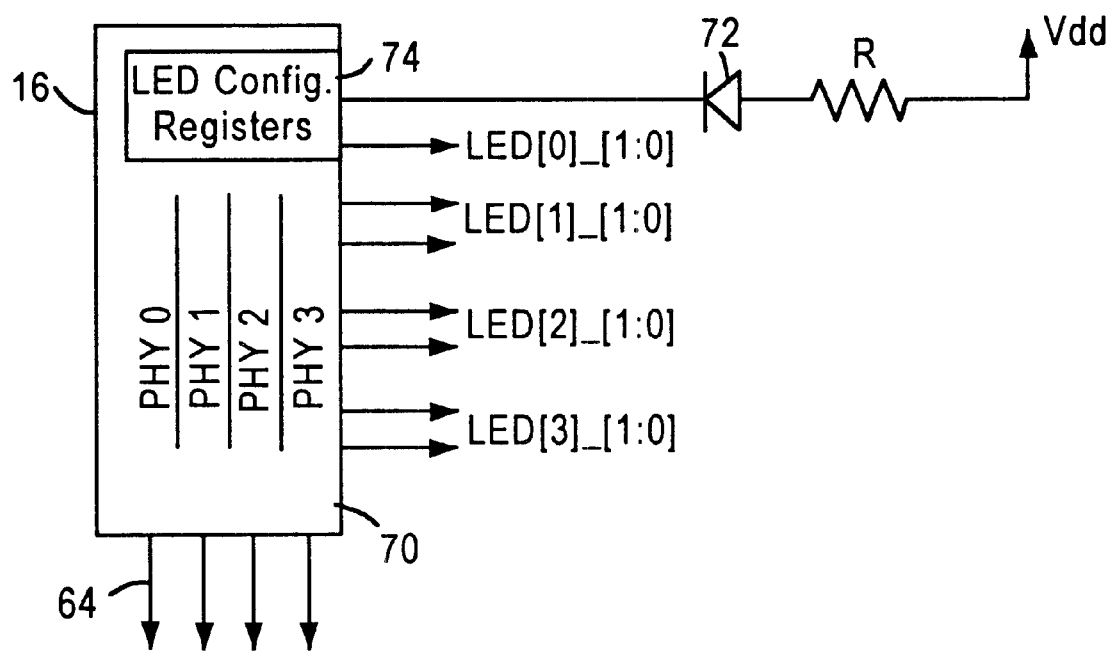
FIG. 3 is a diagram that illustrates an LED interface of the present invention.

Although a single-port PHY transceiver 16 is illustrated in FIG. 2, the transceiver may have multiple physical ports for connecting multiple link partners 50. For example, FIG. 3 shows a four-port transceiver having four physical interfaces 64 for supporting simultaneous connections to four link partners 50 via separate magnetic couplers 62. Each port PHY0 to PHY3 of the transceiver has separate 10 Mb/s data path 56 and 100 Mb/s data path 58 for supporting communication at either 10 Mb/s or 100 Mb/s.

The transceiver 16 is provided with an LED interface 70 having two LED pins for each port. In particular, FIG. 3 illustrates pins LED[0]_[1:0] for port PHY0, pins LED[1]_[1:0] for port PHY1, pins LED[2]_[1:0] for port PHY2 and pins LED[3]_[1:0] for port PHY3. Each of the pins LED[3:0]_[1:0] driven by a TTL driver allows for direct connection to a corresponding LED 72 coupled via a resistor R to a power supply Vdd.

In accordance with the present invention, the LED interface 70 supports a parallel LED mode and a serial LED mode. An LED configuration register 74 provided for each port of the transceiver 16 contains programmable data for configuring the LED interface 70 to operate in any of these modes. In particular, an LED mode bit SER/PAR in the LED configuration register may be programmed to define a serial or parallel LED mode of operation. For example, when the SER/PAR bit is set to 1, the LED interface 70 operates in the serial LED mode. The SER/PAR bit reset to 0 causes the LED interface 70 to operate in the parallel LED mode.

In the parallel LED mode of operation, the pin LED[x]_[1] for each port indicates status of 100 Mb/s communications performed via that port, whereas the pin LED[x]_[0] for each port reflects status of 10 Mb/s communications for the corresponding port. The LED pin for each data rate is driven to an active state in response to any one of various network events defined in the LED configuration register 74. For example, logic 1 at the LED pin may correspond to a TTL low level, and logic 0 may be represented by a TTL high level.

For the parallel LED mode, the LED configuration register 74 may contain bits representing such events as receive activity, transmit activity, collision, link status, full-duplex mode, etc. When any one of the defined events occurs for a 100 Mb/s communication, the pin LED[x]_[1] becomes active. Similarly, when any one of the defined events occurs for a 10 Mb/s communication, the pin LED[x]_[0] is activated. The LED configuration register 74 can prevent the corresponding LED pin from being activated in response to a certain network event by resetting the bit representing that event.

Figure 4:
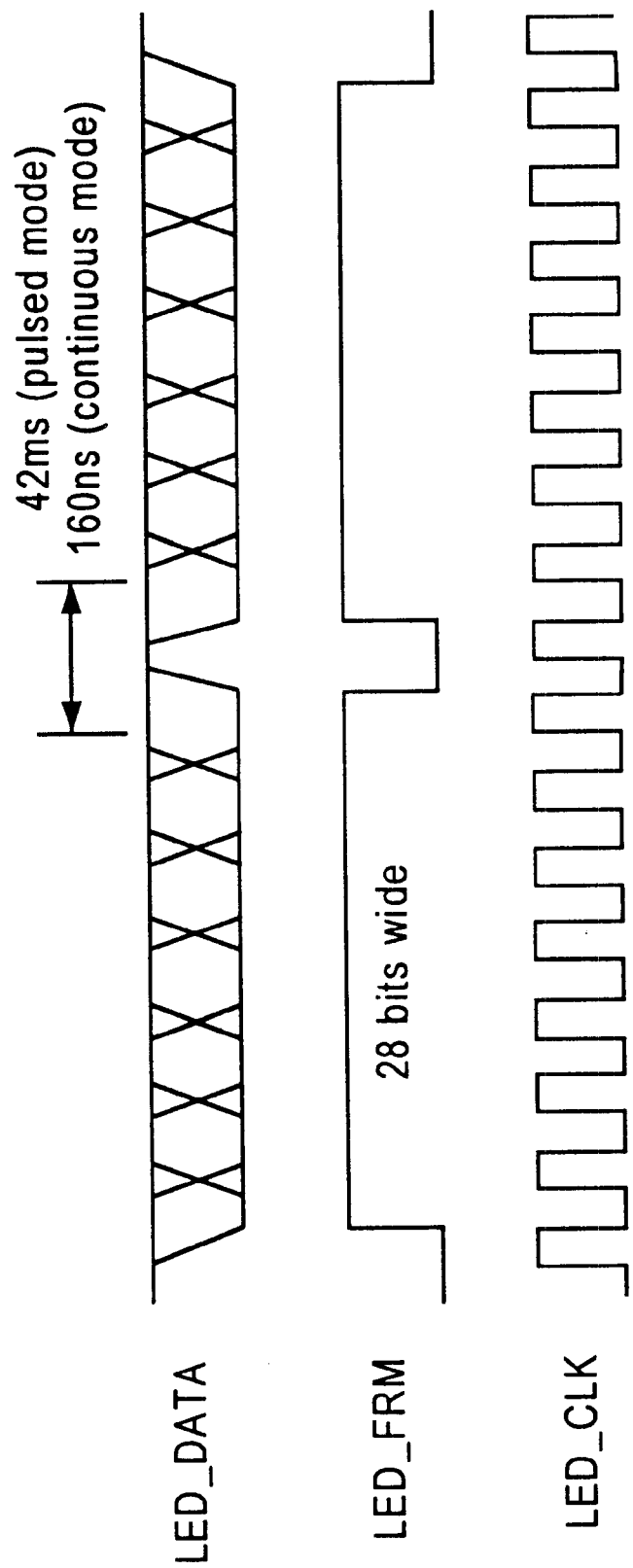
FIG. 4 shows LED signals being outputted in a serial LED mode.

In the serial LED mode, only 3 pins are used to transfer LED information for all four ports of the transceiver 16. One of these LED pins carries a serial data stream LED_DATA (FIG. 4) having multiple status bits for each port. The status bits are defined in the LED configuration register 74 and may represent such communication events as data rate, full duplex or half duplex mode, link status, receive polarity, collision, transmit activity and receive activity. The LED_DATA is formatted in frames representing various events for all ports at a given time period. For example, each frame of the LED_DATA may be composed of bits 0 to 6 for port PHY0, bits 0 to 6 for port PHY1, bits 0 to 6 for port PHY2 and bits 0 to 6 for port PHY3. A logic 1 state of each status bit may be represented by a TTL high level, whereas logic 0 may correspond to a TTL low level.

Bit 0 may indicate a data rate. For example, bit 0 set to 1 corresponds to a communication at 100 Mb/s, and bit 0 reset to 0 indicates that a 10 Mb/s data communication occurs. A logic 1 state of bit 1 indicates that a full duplex mode is established, whereas logic 0 represents a half-duplex mode. Bit 2 represents a link status of the corresponding port. Bit 2 set to 1 corresponds to a link up status, and bit 2 reset to 0 represents a link down status. Bit 3 represents a receive polarity. When the polarity is normal, bit 3 is set to 1. When the polarity is reversed, bit 3 is reset to 0. Bit 4 set to 1 indicates the occurrence of a collision. Bits 5 and 6 set to 1 respectively indicate that transmit and receive activities are detected at the corresponding port.

The second LED pin used in the serial LED mode carries a frame signal LED_FRM (FIG. 4) that identifies the boundary between frames of the LED_DATA. For a four-port transceiver, a 28-bit wide LED_FRAME signal is used.

A 12.5 MHz clock signal LED_CLK (FIG. 4) is carried by the third LED pin used in the serial LED mode. The LED_CLK signal synchronizes the transferring of the LED_DATA serial stream.

For example, the pin LED[0]_[1] may be used for carrying the LED_CLK signal, the pin LED[1]_[1] may carry the LED_FRM signal, and the pin LED[2]_[1] may be supplied with the serial data LED_DATA. The LED pins, which are not used in the serial LED mode, are driven low.

The LED_DATA information may be shifted out in a continuous mode or in a pulsed mode. In the continuous mode, the LED_DATA and LED_FRM signals are output continuously. In this mode, frames are separated by 2 bits to allow external logic to detect the end of one frame and the beginning of the next frame. In the pulsed mode, the LED_DATA and LED_FRM signals are pulsed out at 42 ms intervals. The LED_CLK signal runs continuously between frames.

The LED configuration register 74 contains an output mode bit CONT that may be programmed to define a mode of outputting signals in the serial LED mode. For example, when the CONT bit is set to 1, the LED interface 70 operates in the continuous mode, and when the CONT bit is set to 0, the LED interface 70 is switched into the pulsed mode. Further, the LED configuration register 74 has a frame polarity bit FRMPOL that establishes whether the LED_FRM signal in the serial LED mode is active high or active low.

A pulse stretch option is provided to extend each LED output signal in the parallel and serial modes so as to allow the human eye to detect even short events that lasts only several microseconds. A pulse stretch bit in the LED configuration register 74 may be programmed to enable or disable the pulse stretch option. If the pulse stretch option is enabled, the LED output signals are supplied to a conventional pulse stretcher (not shown) that stretches the LED output for duration of 43 ms to 63 ms.

Accordingly, the present invention enables the LED interface 70 to operate either in a parallel LED mode or in a serial LED mode depending on user requirements.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative way, rather than in a restrictive sense.

What is claimed is:

1. A multi-port transceiver for supporting data communications with multiple data communication devices, the transceiver comprising:

multiple physical ports for providing interface to said multiple data communication devices, an indication interface having at least one pin for each of the ports for providing connection to indication devices, and an indication interface configuration circuit for configuring the indication interface to operate in a parallel indication mode, which provides parallel output of the status data for multiple physical ports, and in a serial indication mode, in which status data for multiple physical ports are being output sequentially in a serial data stream, wherein in the serial indication mode, less than all the pins of the indication interface are used for transferring information for all the ports, with one pin used for shifting out a serial status data stream composed of status bits representing statuses of data communication via the multiple physical ports, and the serial status data stream comprises multiple frames, each of which indicates a plurality of events representing the multiple physical ports.

2. The transceiver of claim 1, wherein said physical ports supports data communication at a first data rate and at a second data rate, and the indication interface includes two pins fore each port.

3. The transceiver of claim 2, wherein in the parallel indication mode, the first pin for each port is for indicating status of data communication at the first data rate, and the second pin for each port is for indicating status of data communication at the second data rate.

4. The transceiver of claim 1, wherein the indication interface further comprises a second different pin for transferring a frame signal indicating boundary between the frames.

5. The transceiver of claim 4, wherein the indication interface further comprises a third different pin for transferring a clock signal for synchronizing the transfer of the serial status data stream.

6. The transceiver of claim 1, wherein the indication interface configuration circuit is programmable by a user to configure the indication interface in the parallel mode of operation in response to a first control signal, and to configure the indication interface in the serial mode in response to a second control signal.

7. The transceiver of claim 1, wherein the indication interface configuration circuit controls the indication interface to output the serial data stream continuously or in a pulsed mode.

8. The transceiver of claim 1, wherein the indication interface configuration circuit controls the indication interface to enable or disable a pulse stretch mode, in which an output indication signal is extended to predetermined duration.

9. The transceiver of claim 1, wherein the indication devices comprise LEDs.

* * * * *